(12) United States Patent
Son (10) Patent No.: US 11,524,747 B2
(45) Date of Patent: Dec. 13, 2022

(54) BICYCLE TRANSMISSION USING VARIABLE SPEED MOTOR AND PLANETARY GEAR MECHANISM

(71) Applicant: Soon Young Son, Seoul (KR)

(72) Inventor: Soon Young Son, Seoul (KR)

( * ) Notice: Subject to any disclaimer, the term of this patent is extended or adjusted under 35 U.S.C. 154(b) by 193 days.

(21) Appl. No.: 17/013,597

(22) Filed: Sep. 6, 2020

(65) Prior Publication Data

US 2020/0398937 A1 Dec. 24, 2020

Related U.S. Application Data

(63) Continuation of application No. PCT/KR2019/002455, filed on Mar. 4, 2019.

(30) Foreign Application Priority Data

Mar. 8, 2018 (KR) .......................... 10-2018-0027226

(51) Int. Cl.
*B62M 11/02* (2006.01)
*B62M 6/55* (2010.01)

(52) U.S. Cl.
CPC .............. *B62M 11/02* (2013.01); *B62M 6/55* (2013.01)

(58) Field of Classification Search
CPC .......... B62M 11/02; B62M 11/14; B62M 6/55
See application file for complete search history.

(56) References Cited

U.S. PATENT DOCUMENTS

| 8,968,134 B2 | 3/2015 | Lee |
| 9,616,969 B2 | 4/2017 | MacMartin |
| 9,908,588 B2 | 3/2018 | Kuehlcke et al. |
| 2013/0184112 A1* | 7/2013 | Choi ..................... F16H 37/065 475/5 |
| 2017/0137088 A1* | 5/2017 | Watarai .................. B62M 11/02 |

FOREIGN PATENT DOCUMENTS

| JP | 9-2368 A | 1/1997 |
| JP | 10-16874 A | 1/1998 |
| JP | 5422749 B2 | 2/2014 |
| JP | 2014-113912 A | 6/2014 |

(Continued)

OTHER PUBLICATIONS

International Search Report for PCT/KR2019/002455 published on Sep. 12, 2019.

(Continued)

*Primary Examiner* — Erin D Bishop (57) ABSTRACT

A bicycle transmission using a variable speed motor and a planetary gear mechanism includes: a first input rotary shaft (10) rotatably connected to a main power source (11); a second input rotary shaft (20) receiving a motor rotational power from a variable speed motor (21); a planetary gear mechanism (30) receiving first and second rotational power respectively from the first input rotary shaft (10) and the second input rotary shaft (20), wherein the planetary gear mechanism (30) includes a ring gear (33), a carrier (31), a plurality of planet gears (32), and a sun gear (34); an output shaft (40) receiving a third rotational power from the planetary gear mechanism (30); and a control unit (50) controlling the variable speed motor (21) and controlling a rotational direction and speed of the second input rotary shaft (20).

4 Claims, 4 Drawing Sheets

(56) References Cited

FOREIGN PATENT DOCUMENTS

| | | |
|---|---|---|
| JP | 2016-182849 A | 10/2016 |
| JP | 2017-19445 A | 1/2017 |
| KR | 10-1354154 B1 | 1/2014 |
| KR | 10-1434483 B1 | 8/2014 |
| WO | 2009/079901 | 7/2009 |

OTHER PUBLICATIONS

International Written opinions for PCT/KR2019/002455 published on Sep. 12, 2019.

* cited by examiner

BICYCLE TRANSMISSION USING VARIABLE SPEED MOTOR AND PLANETARY GEAR MECHANISM

CROSS-REFERENCE TO RELATED APPLICATION

This application is a continuation application of International Application No. PCT/KR2019/002455 filed on Mar. 4, 2019, which claims the benefit of and priority to Korean Patent Application No. 10-2018-0027226 filed on Mar. 8, 2018, which is herein incorporated by reference in its entirety.

TECHNICAL FIELD

The present invention relates to a transmission, and in particular, a bicycle transmission that uses a variable speed motor and a planetary gear mechanism. The variable speed motor is capable of adjusting the speed of a bicycle by using the planetary gear mechanism. The planetary gear mechanism includes a ring gear, a plurality of planet gears, a sun gear, and a carrier, and allows for the transmission of power.

BACKGROUND

In general, a planetary gear device is used to efficiently transmit high power with a compact device.

A manual transmission uses a gear device, in which a plurality of gears is arranged on each of the two or more parallel axes. Using the planetary gear device is more beneficial than using the gear device of the manual transmission in that it minimizes the load on the teeth of each gear, the installation space, and the noise that occurs during operation.

On the other hand, it has a drawback in that a desired transmission ratio cannot be achieved with just one planetary gear unit. Thus, two or more planetary gear units must be installed, which ultimately complicates the structure.

The planetary gear device includes a carrier, a plurality of planet gears provided in the carrier, a ring gear internally meshed with the plurality of planet gears, and a sun gear externally meshed with the plurality of planet gears. The gear ratio can be adjusted depending on several factors such as (i) the number of teeth of the sun gear and the ring gear, (ii) which part of the sun gear, the ring gear, or the carrier of the planetary gear unit connects to the input transmitting main power and the output shaft, (iii) the rotation direction and the rotation speed of respective gears, etc.

These planetary gear devices are widely used in intelligent robots, R/Cs, aircraft, automobiles, office equipment, and machine tools that require compact and lightweight gearboxes, because these planetary gear devices can minimize the weight and maximize the compactness of gearboxes. The planetary gears also have excellent power transmission efficiency characteristics, and are able to withstand high torque because the power is evenly distributed.

Up to now, transmission devices that perform multi-stage shifts using two or more planetary gear devices have been used in various fields such as automobiles. However, the number of planetary gear device sets increases as the number of shift levels increases, increasing the complexity of the structure.

In the case of bicycles, internal gear hubs, such as Shimano, Sram, and others, mechanically utilize a number of planetary gear devices, and thus have a complex structure and a large number of parts.

On the other hand, Korean Patent Registration No. 10-1434483 discloses invention capable of multi-stage shifting which employs two driving motors and a planetary gear device. However, its structure is still complicated In addition, in the case of an electric bicycle, using a plurality of gears allows for the implementation of a multi-stage shifting with deceleration. However, as such a bicycle uses a fixed reduction ratio, a relatively large motor is used, and thus the range of shifting stages is relatively limited.

Clearly, there are emerging needs for the reduction in the size of transmissions and the improvement of energy use efficiency.

There is a constant demand for the reduction in the size of transmissions and improvement of energy use efficiency in all fields of industry, including bicycles.

DETAILED DESCRIPTION OF THE INVENTION

Problems to be Solved

The present invention was conceived to solve the problems of the prior art. An objective of the present invention is to provide a bicycle transmission using a planetary gear mechanism and a variable speed motor whose size can be reduced. The size of the bicycle transmission can be reduced by (i) concentrically arranging the first input rotary shaft and the output shaft, and (ii) by independently connecting each of the second input rotary shaft, the first input rotary shaft, and the output shaft with the component of the planetary gear mechanism. The main power is provided to the first input rotary shaft. The output shaft transmits rotational power through a shifting process to the outside.

Another objective is to provide a bicycle transmission using a planetary gear mechanism and a variable speed motor, which is capable of improving the design of the bicycle and reducing the weight of the bicycle.

Another objective is to provide a bicycle transmission using a planetary gear mechanism and a variable speed motor, which is capable of reducing manufacturing costs by reducing the number of parts and simplifying the coupling between the parts.

Solution to Solve the Problems

A bicycle transmission using a variable speed motor and a planetary gear mechanism according to the present invention, whose objective is to solve the above problems, includes: a first input rotary shaft (10) rotatably connected to a main power source (11); a second input rotary shaft (20) receiving a motor rotational power from a variable speed motor (21); a planetary gear mechanism (30) receiving first and second rotational power respectively from the first input rotary shaft (10) and the second input rotary shaft (20), wherein the planetary gear mechanism (30) includes a ring gear (33), a carrier (31), a plurality of planet gears (32), and a sun gear (34); an output shaft (40) receiving a third rotational power from the planetary gear mechanism (30); and a control unit (50) controlling the variable speed motor (21) and controlling a rotational direction and speed of the second input rotary shaft (20). The first input rotary shaft (10) is arranged concentrically with the output shaft (40), the ring gear (33), the carrier (31), and the sun gear (34).

Here wherein a worm (22) is provided on an outer circumferential surface of the second input rotary shaft (20). The planetary gear mechanism (30) includes: a carrier (31) coupled to and rotating with the first input rotary shaft (10);

a plurality of planet gears (32) rotatably installed on the carrier (31); a ring gear (33) whose inner circumferential surface is meshed with an outer circumferential surface of the plurality of planet gears (32); and a sun gear (34) surrounding the first input rotary shaft (10) and having an extension part (34a). The extension part (34a) is provided on one side of the sun gear (34). A worm wheel (34b) is provided on an outer circumferential surface of the extension part (34a). The worm wheel (34b) rotates while being meshed with the worm (22). A rotation axis of the second input rotary shaft (20) is perpendicular to a rotation axis of the extension part (34a) of the sun gear (34).

The ring gear (33) is provided with a hollow extension part (33a). The hollow extension part (33a) surrounds the first input rotary shaft (10). An output shaft (40) is connected to the hollow extension part (33a), wherein the output shaft (40) surrounds the first input rotary shaft (10). The output shaft and the first input rotary shaft are concentrically arranged with each other.

In addition, the plurality of planet gears comprises: a first plurality of planet gears rotating while being externally meshed with the sun gear; and a second plurality of planet gears rotating while being externally meshed with the first plurality of planet gears and being internally meshed with the ring gear.

Meanwhile, a worm (22) is provided on an outer circumferential surface of the second input rotary shaft (20). The planetary gear mechanism (30) includes: a carrier (31) coupled to and rotating with the first input rotary shaft (10); a plurality of planet gears (32) rotatably installed on the carrier (31); a ring gear (33) provided with an extension part (33a), wherein an inner circumferential surface of the ring gear (33) is meshed with an outer circumferential surface of the plurality of planet gears (32), wherein a worm wheel (33b) is provided on an outer circumferential surface of the extension part (33a), wherein the worm wheel (33b) rotates while being meshed with a worm (22); and a sun gear (34) rotating while being meshed with the plurality of planet gears (32). A rotation axis of the second input rotary shaft (20) is perpendicular to a rotation axis of the extension part (33a) of the ring gear (33).

The sun gear (34) is provided with a hollow extension (34a), wherein the hollow extension (34a) surrounds the first input rotary shaft (10). An output shaft (40) surrounding the first input rotary shaft (10) is connected to the extension (34a). The output shaft and the first input rotary shaft are concentrically arranged with each other.

In addition, a worm (22) is provided on an outer circumferential surface of the second input rotary shaft (20). The planetary gear mechanism (30) includes: a sun gear (34) coupled to the first input rotary shaft (10) and rotating together with the first input rotary shaft (10); a plurality of planet gears (32) rotating while being meshed with the sun gear (34); a carrier (31) provided with an extension part (31b), wherein the plurality of planet gears (32) is rotatably installed on the carrier (31), wherein a worm wheel (31c) is installed on an outer circumferential surface of the extension part (31b), wherein the worm wheel (31c) rotates while being meshed with the worm (22); and a ring gear (33), wherein an inner circumferential surface of the ring gear (33) is meshed with an outer circumferential surface of the plurality of planet gears (32). A rotation axis of the second input rotary shaft (20) is perpendicular to a rotation axis of the extension part (31b) of the carrier (31).

The ring gear (33) is provided with a hollow extension part (33a), wherein the hollow extension part (33a) surrounds the first input rotary shaft (10). The output shaft (40) surrounds the first input rotary shaft (10) and is connected to the extension part (33a).

A worm (22) is provided on an outer circumferential surface of the second input rotary shaft (20). The planetary gear mechanism (30) includes: a ring gear (33) coupled to the first input rotary shaft (10) and rotating together with the first input rotary shaft (10); a plurality of planet gears (32), wherein an outer circumferential surface of the plurality of planet gears (32) is meshed with an inner circumferential surface of the ring gear (33); a carrier (31) provided with an extension part (31b), wherein the plurality of planet gears (32) is rotatably installed on the carrier (31), wherein a worm wheel (31c) is installed on an outer circumferential surface of the extension part (31b), wherein the worm wheel (31c) rotates while being meshed with the worm (22); and a sun gear (34) rotating while being meshed with the plurality of planet gears (32). A rotation axis of the second input rotary shaft (20) is perpendicular to a rotation axis of the extension part (31b) of the carrier (31).

The sun gear (34) is provided with a hollow extension part (34a), wherein the hollow extension part (34a) surrounds the first input rotary shaft (10). The output shaft (40) surrounds the first input rotary shaft (10) and is connected to the extension part (34a). The output shaft and the first input rotary shaft are concentrically arranged with each other.

The plurality of planet gears (32) comprises: a first plurality of planet gears (32a) rotating while being externally meshed with the sun gear (34); and a second plurality of planet gears (32b) externally meshed with the first plurality of planet gears (32a) and internally meshed with the ring gear (33).

Meanwhile, the main power source (11) is connected to both ends of the first input rotary shaft (10).

Advantages of Invention

In the bicycle transmission using the variable speed motor and the planetary gear mechanism of the present invention, (i) the first input rotary shaft receiving the main rotational power from the main power source and (ii) the output shaft are arranged in a concentric manner. In addition, all components of the planetary gear mechanism are connected to (i) the first input rotary shaft, (ii) the second input rotary shaft receiving the motor rotational power from a variable speed motor, and (iii) the output shaft. Under this structure, the transmission can be configured with just one planetary gear mechanism and a variable speed motor. Thus, the transmission can be reduced in size.

Since the reduction in the size is possible in this way, applying the transmission of the present invention to a bicycle or the like can improve the aesthetics of the design of the bicycle and make it easier to make any changes to the design of the bicycle.

In addition, applying the transmission of the present invention to a bicycle or the like can reduce the weight of the bicycle because it is possible to reduce the size and adjust the speed to various extents.

In addition, there is an advantage of reducing the manufacturing costs because the number of parts is small and the structure at which the constituent parts are interconnected is not complicated, In addition, there is an advantage of reducing the size of the variable speed motor because the speed can be adjusted by gradually adjusting the main power, which is generated from the main power source and is required for driving, with the variable speed motor.

EMBODIMENTS

Hereinafter, an embodiment of a bicycle transmission using a variable speed motor and a planetary gear mechanism according to the present invention will be described in detail with reference to the accompanying drawings.

Figure 1:
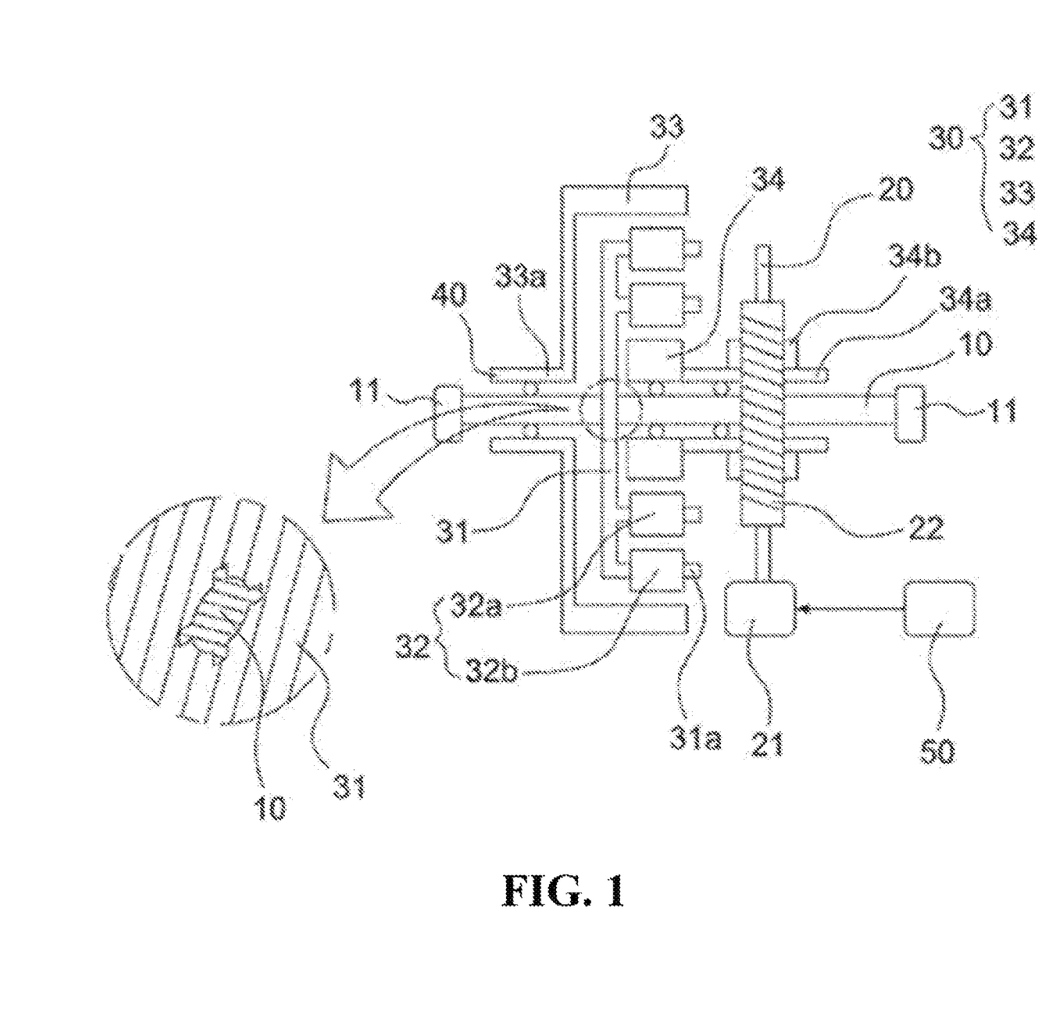
FIG. 1 is a view showing a first embodiment of a bicycle transmission using a variable speed motor and a planetary gear mechanism according to the present invention.

FIG. 1 is a diagram showing a first embodiment of a bicycle transmission using a variable speed motor and a planetary gear mechanism according to the present invention.

The transmission according to the present invention shown in FIG. 1 is to increase or decrease the rotational power, which is generated by the motion of the pedal installed on the bicycle, as necessary, and transmit rotational power to the wheels. The transmission includes: a first input rotary shaft (10) rotatably connected to a main power source (11); a second input rotary shaft (20) receiving a motor rotational power from a variable speed motor (21); a planetary gear mechanism (30) receiving first and second rotational power respectively from the first input rotary shaft (10) and the second input rotary shaft (20), wherein the planetary gear mechanism (30) includes a ring gear (33), a carrier (31), a plurality of planet gears (32), and a sun gear (34); an output shaft (40) receiving a third rotational power from the planetary gear mechanism (30); and a control unit (50) controlling the variable speed motor (21) and controlling a rotational direction and speed of the second input rotary shaft (20). The first input rotary shaft (10) is arranged concentrically with the output shaft (40), the ring gear (33), the carrier (31), and the sun gear (34).

The first input rotary shaft (10) is connected to a main power source (11) and rotates by receiving main rotational power from the main power source (11).

At least one of both ends of the first input rotary shaft (10) is connected to the main power source (11) such as a pedal on which a user steps or a driving motor (in the case of an electric bicycle). The first input rotary shaft (10) is rotated by main rotational power transmitted from the main power source (11).

That is, just one main power source (11) may be connected to one end of the first input rotary shaft (10), or two main power sources (11) may be connected, with one at each end of the first input rotary shaft (10).

The second input rotary shaft (20) is rotated by receiving the motor rotational power from the variable speed motor (21). The second input rotary shaft (20) may be formed by extending the rotary shaft of the variable speed motor (21) itself, or by connecting a separate rotary shaft to the variable speed motor (21).

The planetary gear mechanism (30) includes a carrier (31), a plurality of planet gears (32) that are installed on the carrier (31) such that plurality of planet gears (32) can be rotated, a ring gear (33), whose inner circumferential surface is meshed with the outer circumferential surface of the plurality of planet gears (32), and a sun gear (34), which rotates while being meshed with the plurality of planet gears (32).

The carrier (31) supports a plurality of planet gears (32) so that each planet gear can rotate, and a central portion of the carrier (31) is coupled to the first input rotary shaft (10) so that the carrier (31) and the first input rotary shaft (10) rotate together in the same direction and at the same speed.

If the carrier (31) is too thin, the carrier (31) and the first input rotary shaft (10) may not be stably coupled. To reinforce the coupling between the carrier (31) and the first input rotary shaft (10), a hollow extension part (not shown) of a certain length can be formed to protrude at the center of the carrier (31), so that the hollow extension part can be firmly coupled to the first input rotary shaft (10).

In more detail, the center portion of the carrier (31) and the first input rotary shaft (10) can be coupled, in the manner that a spline and a boss are coupled together. By forming a plurality of long protrusions on the first input rotary shaft (10) and an insertion groove into which the protrusions is inserted in the penetrating central portion of (31), the first input rotary shaft (10) can pass through the central portion of the carrier (31) while a first rotational power of the first input rotary shaft (10) can be transmitted to the carrier (31) without loss. Since there are various coupling structures that allow for the transmission of the first rotational power from the first input rotary shaft (10) to the carrier (31) without loss, a description of other coupling methods will be omitted.

Such a carrier (31) includes a plurality of support shafts (31a) that passes through the central portion of the plurality of planet gears (32). Therefore, the plurality of planet gears (32) rotates about the plurality of support shafts (31a) of the carrier (31).

The plurality of planet gears (32) is supported on the plurality of support shafts (31a), so that the plurality of planet gears (32) can be rotated, and positioned around the sun gear (34). The plurality of planet gears (32) comprises a first plurality of planet gears (32a) and a second plurality of planet gears (32b) externally meshed with the first plurality of planet gears (32a).

The first plurality of planet gears (32a) rotates while being externally meshed with the sun gear (34).

The second plurality of planet gears (32b) rotates while being externally meshed with the first plurality of planet gears (32a) and internally meshed with the ring gear (33).

The ring gear (33) is a portion on which the output shaft (40) is installed. Gear teeth are formed on the inner circumferential surface of the ring gear (33), and the second plurality of planet gears (32b) is meshed with the gear teeth on the inner circumferential surface.

The ring gear (33) has a hollow extension part (33a) surrounding the first input rotary shaft (10) at the center. In addition, the output shaft (40) surrounding the first input rotary shaft (10) is connected to the extension part (33a) of the ring gear (33), and as a result, the output shaft (40) and the first input rotary shaft (10) are concentrically arranged.

The sun gear (34) receives a second rotational power from the second input rotary shaft (20) and meshes with the plurality of planet gears (32) to rotate. The sun gear (34) is installed at the center of the planetary gear mechanism (30). Gear teeth are formed on the outer circumferential surface of the sun gear (34), and meshes with the first plurality of planet gears (32a).

In addition, in the sun gear (34), the central portion is penetrated by the first input rotary shaft (10) and bearings can be installed between the first input rotary shaft (10) and the sun gear (34), so that the first rotational power of the first input rotary shaft (10) does not directly affect the sun gear (34).

On the other hand, a hollow extension part (34a) surrounding the first input rotary shaft (10) is provided on one side of the sun gear (34), and a worm wheel (34b) is provided on the outer circumferential surface of the extension part (34a) of the sun gear (34).

In addition, a worm (22) meshed with the worm wheel (34b) is provided on the outer circumferential surface of the second input rotary shaft (20). Therefore, when the second input rotary shaft (20) is rotated by the motor rotational power transmitted from the variable speed motor (21), the worm (22) rotates as well. The rotation of the worm (22) causes the rotation of a worm wheel (34b) meshed with the worm (22), which then causes the extension part (34a) of the sun gear (34) to rotate. Ultimately, this rotates the sun gear (34).

The output shaft (40) is a portion installed on the ring gear (33) to receive a third rotational power. The output shaft (40) may be formed as an integral extension of the extension part (33a) of the ring gear (33), or as a separate hollow pipe that is coupled to the extension part (33a) of the ring gear (33), in the manner that a spline and a boss are coupled together, as described earlier.

The output shaft (40) is disposed in a concentric circle with the first input rotary shaft (10) because the central portion of the output shaft (40) passes through the first input rotary shaft (10). In addition, the output shaft (40) is concentrically arranged with the carrier (31), the ring gear (33), and the sun gear (34).

On the other hand, the second input rotary shaft (20) has the worm (22) formed on the outer circumferential surface as described above, and the worm wheel (34b), which rotates while being meshed with the worm (22), is provided at the extension part (34a) of the sun gear (34). Therefore, a rotation axis of the second input rotary shaft (20) is perpendicular to a rotation axis of the extension part (34a) of the sun gear (34).

The control unit (50) rotates the variable speed motor (21) in the forward and reverse direction and controls the rotational speed of the variable speed motor (21).

A brief look at the shifting process of the transmission of FIG. 1 configured as described above is as follows.

When the main power source (11) such as a pedal or a driving motor is operated, the first input rotary shaft (10) rotates, and the first rotational power of the first input rotary shaft (10) is sequentially transmitted to the carrier (31), the plurality of planet gears (32), and the ring gear (33).

At the same time, when the variable speed motor (21) is operated and the second input rotary shaft (20) rotates, the second rotational power of the second input rotary shaft (20) is sequentially transmitted to the sun gear (34) and the plurality of planet gears (32).

Accordingly, the main rotational power from the main power source (11) and the motor rotational power from the variable speed motor (21) are combined and transmitted to the output shaft (40) through the ring gear (33).

Figure 2:
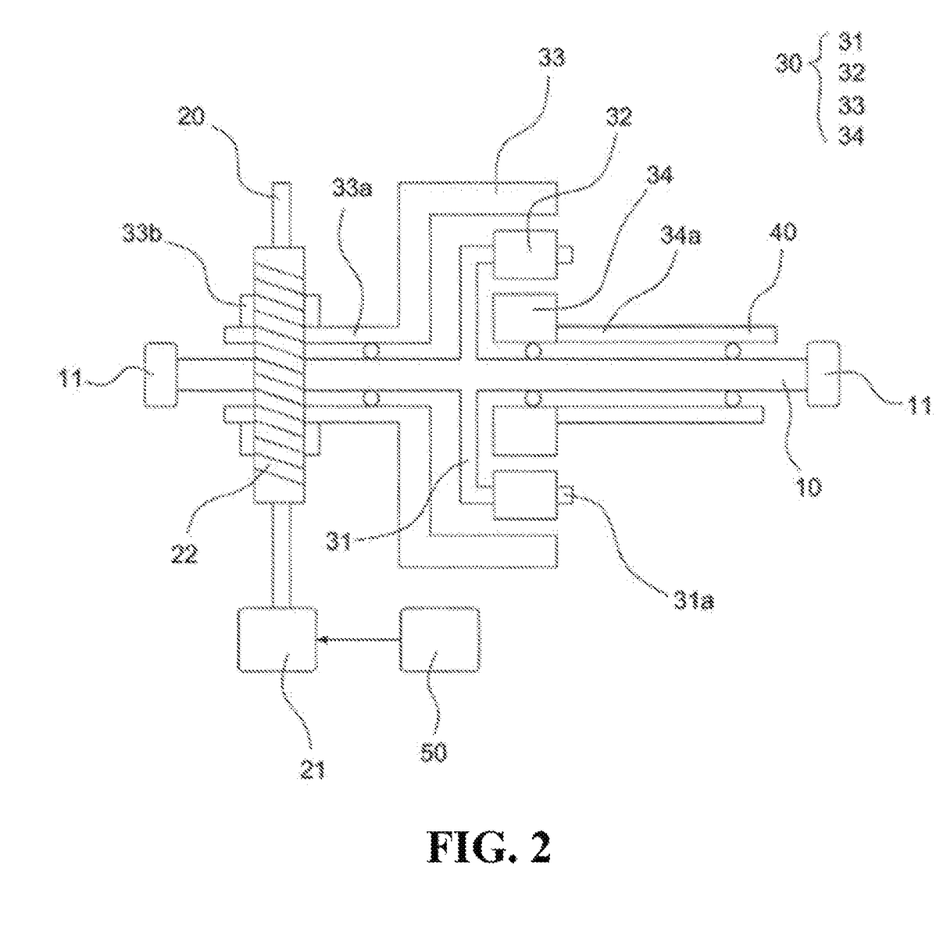
FIG. 2 is a view showing a second embodiment of a bicycle transmission using a variable speed motor and a planetary gear mechanism according to the present invention.

On the other hand, a bicycle transmission using a variable speed motor and a planetary gear mechanism according to the present invention may be configured as shown in FIG. 2.

FIG. 2 is a view showing a second embodiment of a bicycle transmission using a variable speed motor and a planetary gear mechanism according to the present invention.

Since the transmission device according to the present invention shown in FIG. 2 is not structurally different from the transmission device shown in FIG. 1, a description will be made for the differentiated parts.

The transmission device according to the present invention shown in FIG. 2 includes a first input rotary shaft (10), a second input rotary shaft (20), a planetary gear mechanism (30), an output shaft (40), and a control unit (50). The first input rotary shaft (10) is connected to a main power source (11) and rotates. The second input rotary shaft (20) receives the motor rotational power from the variable speed motor (21). The planetary gear mechanism (30) receives first and second rotational power respectively from the first input rotary shaft (10) and the second input rotary shaft (20), and includes a ring gear (33), a carrier (31), a plurality of planet gear (32) and a sun gear (34). The output shaft (40) receives a third rotational power from the planetary gear mechanism (30). The control unit (50) controls the rotational direction and speed of the second input rotary shaft (20) by controlling the variable speed motor (21).

The planetary gear mechanism (30) includes a carrier (31), a plurality of planet gears (32) installed on the carrier (31) such so that each of the plurality of planet gears (32) can be rotated, a ring gear (33), whose inner circumferential surface is meshed with the outer circumferential surface of the plurality of planet gears (32), and a sun gear (34), which rotates while being meshed with the plurality of planet gears (32).

The carrier (31) supports the plurality of planet gears (32) so that each planet gear can rotate, and a central portion of the carrier (31) is coupled to the first input rotary shaft (10) so that the carrier (31) and the first input rotary shaft (10) rotate together in the same direction and at the same speed. This carrier (31) includes a plurality of support shafts (31a) that penetrates the central portion of the plurality of planet gears (32).

The plurality of planet gears (32) is supported on the plurality of support shafts (31a) of the carrier (31) in such a way that the plurality of planet gears (32) can be rotated.

The ring gear (33) has gear teeth formed on the inner circumferential surface. The plurality of planet gears (32) is meshed with the gear teeth on the inner circumferential surface. And the ring gear (33) is provided with the second rotational power from the second input rotary shaft (20).

In addition, the ring gear (33) is provided with the extension part (33a) surrounding the first input rotary shaft (10). The worm wheel (33b) is provided on the outer circumferential surface of the extension part (33a) of the ring gear (33). In addition, the worm (22) meshed with the worm wheel (33b) is provided on the outer circumferential surface of the second input rotary shaft (20). Therefore, when the second input rotary shaft (20) is rotated by the motor rotational power transmitted from the variable speed motor (21), the worm (22) rotates as well. The rotation of the worm (22) causes the rotation of the worm wheel (33b) meshed with the worm (22), which then causes the extension part (33a) of the ring gear (33) to rotate. Ultimately, this rotates the ring gear (33).

The sun gear (34) is located at the center of the planetary gear mechanism (30), and has the gear teeth formed along the outer circumferential surface. The gear teeth of the outer circumferential surface are meshed with the gear teeth formed on the outer circumferential surface of the plurality of planetary gear (32).

In addition, in the sun gear (34), the central portion is penetrated by the first input rotary shaft (10) and bearings can be installed between the first input rotary shaft (10) and the sun gear (34), so that the first rotational power of the first input rotary shaft (10) does not directly affect the sun gear (34).

On the other hand, the sun gear (34) has a hollow extension part (34a) surrounding the first input rotary shaft (10) at the center, and the extension part (34a) of the sun gear (34) is connected to the output shaft (40) surrounding the first input rotary shaft (10).

The output shaft (40) may be formed as an integral extension of the extension part (34a) of the sun gear (34), or as a separate hollow pipe that is coupled to the extension part (34a) of the sun gear (34), in the manner that a spline and a boss are coupled together.

The output shaft (40) is disposed in a concentric circle with the first input rotary shaft (10) because the central portion of the output shaft (40) passes through the first input rotary shaft (10). In addition, the output shaft (40) is disposed concentrically with the carrier (31), the ring gear (33), and the sun gear (34).

Meanwhile, the second input rotary shaft (20) has the worm (22) formed on the outer circumferential surface as described above, and the worm wheel (33b), which is meshed with the worm (22) and rotates, is provided at the extension part (33a) of the ring gear (33). Therefore, the rotation axis of the second input rotary shaft (20) is perpendicular to the rotation axis of the extension part (33a) of the ring gear (33).

A brief look at the shifting process of the transmission of FIG. 2 configured as described above is as follows.

When the main power source (11) such as a pedal or a driving motor is operated, the first input rotary shaft (10) rotates, and the first rotational power of the first input rotary shaft (10) is sequentially transmitted to the carrier (31), the plurality of planet gears (32), and the sun gear (34).

At the same time, when the variable speed motor (21) is operated and the second input rotary shaft (20) rotates, the second rotational power of the second input rotary shaft (20) is sequentially transmitted to the ring gear (33) and the plurality of planet gears (32).

Accordingly, the main rotational power provided from the main power source (11) and the motor rotational power provided from the variable speed motor (21) are combined and transmitted to the output shaft (40) through the sun gear (34).

In the above, the transmissions shown in FIGS. 1 and 2 have been described. Hereinafter, the transmission shown in FIG. 3 will be described.

Figure 3:
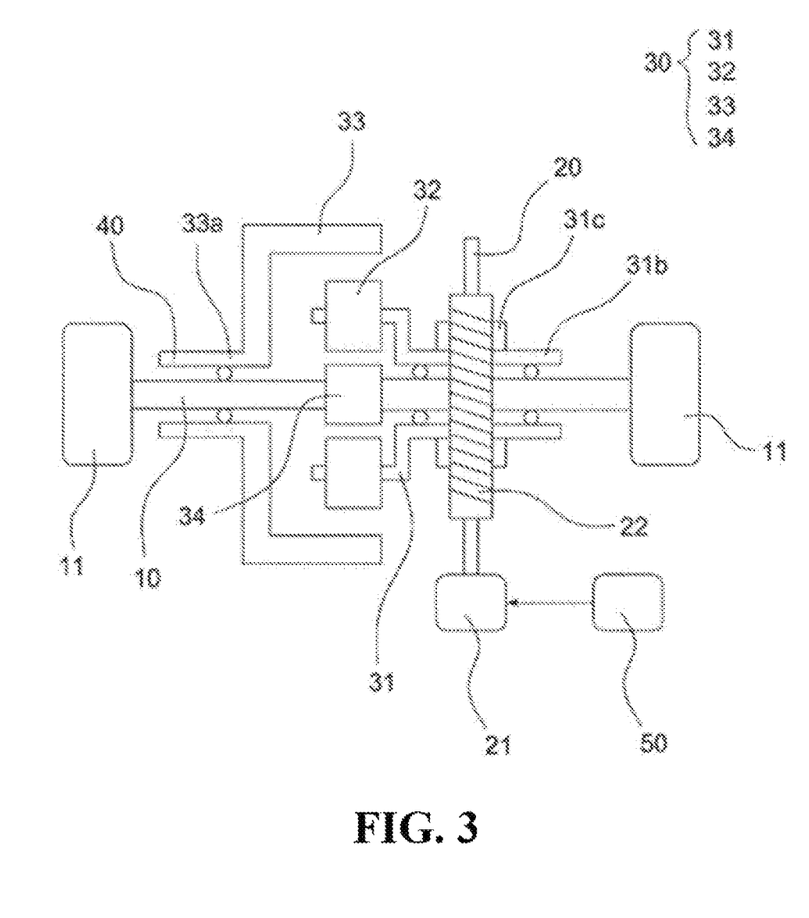
FIG. 3 is a view showing a third embodiment of a bicycle transmission using a variable speed motor and a planetary gear mechanism according to the present invention.

FIG. 3 is a view showing a third embodiment of a bicycle transmission using a variable speed motor and a planetary gear mechanism according to the present invention.

The description of the transmission according to the present invention shown in FIG. 3 will focus on aspects of the transmission that were not shown in FIGS. 1 and 2.

The transmission according to the present invention shown in FIG. 3 includes a first input rotary shaft (10), a second input rotary shaft (20), a planetary gear mechanism (30), an output shaft (40), and a control unit (50).

The first input rotary shaft (10) is connected to a main power source (11) and rotates. The second input rotary shaft (20) receives the motor rotational power from a variable speed motor (21). The planetary gear mechanism (30) receives first and second rotational power respectively from the first input rotary shaft (10) and the second input rotary shaft (20), and includes a ring gear (33), a carrier (31), a plurality of planet gear (32) and a sun gear (34). The output shaft (40) receives a third rotational power from the planetary gear mechanism (30). The control unit (50) controls the rotational direction and speed of the second input rotary shaft (20) by controlling the variable speed motor (21).

The planetary gear mechanism (30) includes a sun gear (34), a plurality of planet gears (32), a carrier (31), and a ring gear (33). The plurality of planet gears (32) rotates while being meshed with the sun gear (34). The plurality of planet gears (32) is installed on the carrier (31) such that the plurality of planet gears (32) can rotate. An output shaft (40) is installed on the ring gear (33). The inner circumferential surface of the ring gear (33) is meshed with the outer circumferential surface of the plurality of planet gears (32).

The sun gear (34) is installed at the center of the planetary gear mechanism (30). Gear teeth are formed on the outer circumferential surface of the sun gear (34), and mesh with the plurality of planet gears (32).

In addition, the sun gear (34) has a central portion coupled to the first input rotary shaft (10), in the manner that a spline and a boss are coupled together. The sun gear (34) rotates together with the first input rotary shaft (10) at the same speed and in the same direction.

The plurality of planet gears (32) are supported on the plurality of support shafts (31a) of the carrier (31), so that the plurality of planet gears (32) can be rotated, and externally meshes with the sun gear (34) and internally meshes with the ring gear (33).

The carrier (31) receives the second rotational power from the second input rotary shaft (20).

In addition, the carrier (31) is provided with an extension part (31b) surrounding the first input rotary shaft (10). A worm wheel (31c) is provided on the outer circumferential surface of the extension part (31b) of the carrier (31).

In addition, the second input rotary shaft (20) is provided with the worm (22) that meshes with the worm wheel (31c).

Therefore, when the second input rotary shaft (20) is rotated by the motor rotational power transmitted from the variable speed motor (21), the worm (22) rotates as well. The rotation of the worm (22) causes the rotation of the worm wheel (31c) meshed with the worm (22), which rotates the extension part (31b) of the carrier (31). Ultimately, this rotates the carrier (31).

The ring gear (33) has gear teeth formed on the inner circumferential surface that mesh with the plurality of planet gears (32). The ring gear (33) has the hollow extension part (33a) surrounding the first input rotary shaft (10) at the center.

The output shaft (40) surrounding the first input rotary shaft (10) is connected to the extension part (33a) of the ring gear (33).

The output shaft (40) may be formed as an integral extension of the extension part (33a) of the ring gear (33), or as a separate hollow pipe that is coupled to the extension part (33a) of the ring gear (33), in the manner that a spline and a boss are coupled together.

The first input rotary shaft (10) passes through the center of the output shaft (40). Thus, the output shaft (40) is arranged in a concentric manner with the first input rotary shaft (10). In addition, the output shaft (40) is disposed concentrically with the carrier (31), the ring gear (33), and the sun gear (34).

On the other hand, the second input rotary shaft (20) has the worm (22) formed on the outer circumferential surface as described above, and the worm wheel (31c), which rotates while being meshed with the worm (22), is provided at the extension part (31b) of the carrier (31). Therefore, the rotation axis of the second input rotary shaft (20) is perpendicular to the rotation axis of the extension part (31b) of the carrier (31).

A brief look at the shifting process of the transmission of FIG. 3 configured as described above is as follows.

When the main power source (11) such as a pedal or a driving motor is operated, the first input rotary shaft (10) rotates, and the first rotational power of the first input rotary shaft (10) is sequentially transmitted to the sun gear (34), the plurality of planet gears (32), and the ring gear.

At the same time, when the variable speed motor (21) is operated and the second input rotary shaft (20) rotates, the second rotational power of the second input rotary shaft (20) is sequentially transmitted to the carrier (31) and the plurality of planet gears (32).

Accordingly, the main rotational power provided from the main power source (11) and the motor rotational power provided from the variable speed motor (21) are combined and transmitted to the output shaft (40) through the ring gear (33).

In the above, the transmissions shown in FIGS. 1 to 3 have been described. Hereinafter, the transmission shown in FIG. 4 will be described.

Figure 4:
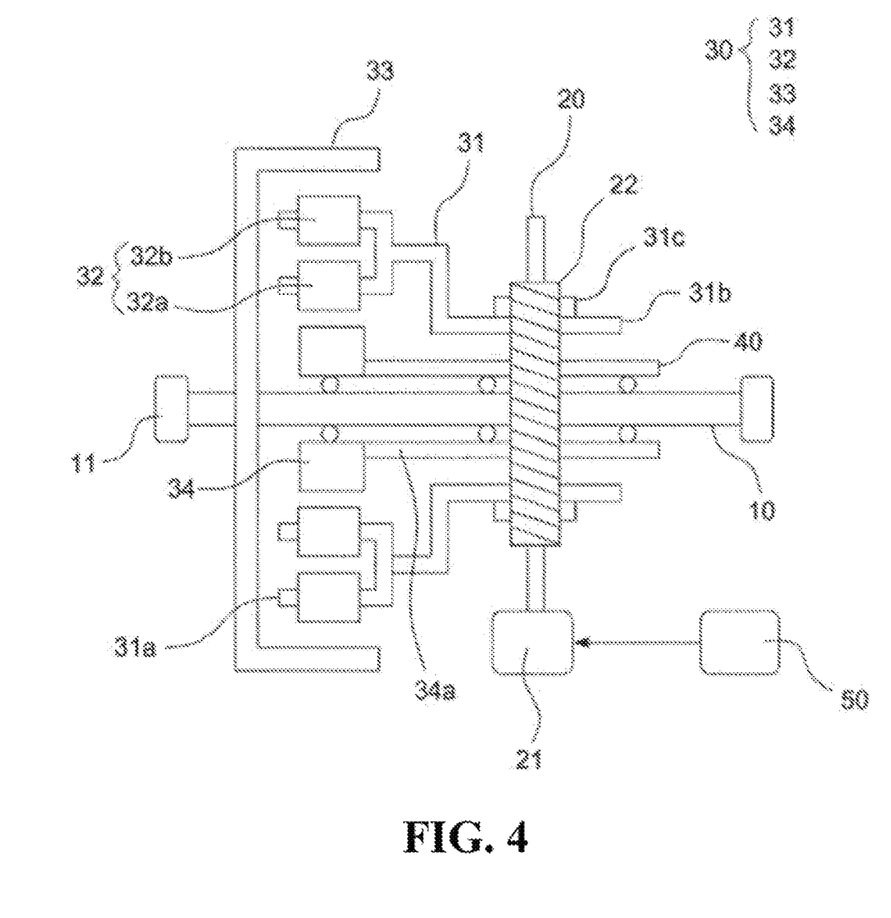
FIG. 4 is a view showing a fourth embodiment of a bicycle transmission using a variable speed motor and a planetary gear mechanism according to the present invention.

FIG. 4 is a view showing a fourth embodiment of a bicycle transmission using a variable speed motor and a planetary gear mechanism according to the present invention.

The description of the transmission according to the present invention shown in FIG. 4 will focus on aspects of the transmission device that were not shown in FIG. 1 to FIG. 3.

The transmission according to the present invention shown in FIG. 4 includes a first input rotary shaft (10), a second input rotary shaft (20), a planetary gear mechanism (30), an output shaft (40), and a control unit (50). The first input rotary shaft (10) is connected to a main power source (11) and rotates. The second input rotary shaft (20) receives the motor rotational power from a variable speed motor (21). The planetary gear mechanism (30) receives first and second rotational power respectively from the first input rotary shaft (10) and the second input rotary shaft (20), and includes a ring gear (33), a carrier (31), a plurality of planet gear (32) and a sun gear (34). The output shaft (40) receives a third rotational power from the planetary gear mechanism (30). The control unit (50) controls the rotational direction and speed of the second input rotary shaft (20) by controlling the variable speed motor (21).

The planetary gear mechanism (30) includes a ring gear (33), a plurality of planet gears (32) whose outer circumferential surface is meshed with the inner circumferential surface of the ring gear (33), and a carrier (31) on which the plurality of planet gears (32) is rotatably installed, and a sun gear (34) meshed with the plurality of planet gears (32) and on which the output shaft (40) is installed.

The ring gear (33) has gear teeth formed on the inner circumferential surface, the plurality of planet gears (32) are meshed with the gear teeth on the inner circumferential surface, and is provided with the first rotational power from the first input rotary shaft (10).

In addition, the ring gear (33) has a central portion coupled to the first input rotary shaft (10), in the manner that a spline and a boss are coupled together. The ring gear (33) rotates together with the first input rotary shaft (10) at the same speed in the same direction. If the ring gear (33) is too thin, the ring gear (33) and the first input rotary shaft (10) may not be stably coupled. To reinforce the coupling between the ring gear (33) and the first input rotary shaft (10), a hollow extension part (not shown) of a certain length can be formed to protrude at the center of the carrier (31), so that the hollow extension part can be firmly coupled to the first input rotary shaft (10).

The plurality of planet gears (32) is supported on a plurality of support shafts (31a) of the carrier (31), so that the plurality of planet gears (32) can be rotated, and positioned around the sun gear (34). The plurality of planet gears (32) comprises a first plurality of planet gears (32a) and a second plurality of planet gears (32b), which are externally meshed to the first plurality of planet gears (32a).

The first plurality of planet gears (32a) rotates while being externally meshed with the sun gear (34).

The second plurality of planet gears (32b) rotates while being externally meshed with the first plurality of planet gears (32a) and internally meshed with the ring gear (33).

In addition, the first plurality of planet gears (32a) and the second plurality of planet gears (32b) are positioned in between the ring gear (33) and the sun gear (34). The first plurality of planet gears (32a) externally meshes with the sun gear (34), while the second plurality of planet gears (32b) is internally meshed with the ring gear (33). The first plurality of planet gears (32a) and the second plurality of planet gears (32b) are meshed with each other and rotated in opposite directions.

The carrier (31) includes a plurality of support shafts (31a) penetrating the central portion of the plurality of planet gears (32). This allows one end of the carrier (31) to support a plurality of planet gears (32) so that the plurality of planet gears (32) can rotate. The carrier (31) receives the second rotational power from the second input rotary shaft (20).

In addition, the center of one end of the carrier (31) is provided with a hollow extension part (31b) surrounding the first input rotary shaft (10) and the output shaft (40). The worm wheel (31c) is provided on the outer circumferential surface of the extension part (31b) of the carrier (31). In addition, the second input rotary shaft (20) is provided with the worm (22) that meshes with the worm wheel (31c). Therefore, when the second input rotary shaft (20) is rotated by the motor rotational power transmitted from the variable speed motor (21), the worm (22) rotates as well. The rotation of the worm (22) causes the rotation of the worm wheel (31c) meshed with the worm (22), which then causes the extension part (31c) of the carrier (31) to rotate. Ultimately, this rotates the carrier (31).

The sun gear (34) is located at the center of the planetary gear mechanism (30), and has gear teeth formed along the outer circumferential surface. The gear teeth of the outer circumferential surface are meshed with the gear teeth formed on the outer circumferential surface of the first plurality of planet gears (32a).

In addition, in the sun gear (34), the central portion is penetrated by the first input rotary shaft (10) and a bearing can be installed between the first input rotary shaft (10) and the sun gear (34), so that the first rotational power of the first input rotary shaft (10) does not directly affect the sun gear (34).

On the other hand, the sun gear (34) has a hollow extension part (34a) surrounding the first input rotary shaft (10) at the center, and the extension part (34a) of the sun gear (34) is connected to the output shaft (40) surrounding the first input rotary shaft (10).

The output shaft (40) is installed on the sun gear (34) to receive the third rotational power. The output shaft (40) may be an integral extension of the extension part (34a) of the sun gear (34). In another embodiment, the output shaft (40) may be a separate hollow pipe that is coupled to the extension part (34a) of the sun gear (34) in the manner that a spline and a boss are coupled together.

The output shaft (40) is disposed in a concentric circle with the first input rotary shaft (10) because the central portion of the output shaft (40) passes through the first input rotary shaft (10). In addition, the output shaft (40) is concentrically arranged with the carrier (31), the ring gear (33), and the sun gear (34).

Meanwhile, the second input rotary shaft (20) has the worm (22) formed on the outer circumferential surface as described above, and the worm wheel (31c), which rotates while being meshed with the worm (22), is provided at the extension part (31b) of the carrier (31). Therefore, the axis of rotation of the second input rotary shaft (20) is perpendicular to the axis of rotation of the extension part (31b) of the carrier (31).

A brief look at the shifting process of the transmission of FIG. 4 configured as described above is as follows.

When the main power source (11) such as a pedal or a driving motor is operated, the first input rotary shaft (10) rotates, and the first rotational power of the first input rotary shaft (10) is sequentially transmitted to the ring gear (33), the second plurality of planet gears (32b), the first plurality of planet gears (32a) and the sun gear (34)

At the same time, when the variable speed motor (21) is operated and the second input rotary shaft (20) rotates, the second rotational power of the second input rotary shaft (20) is sequentially transmitted to the carrier (31) and the plurality of planet gears (32).

Accordingly, the main rotational power provided from the main power source (11) and the motor rotational power provided from the variable speed motor (21) are combined and transmitted to the output shaft (40) through the ring gear (33).

The transmission process and the acceleration/deceleration of the bicycle transmission using the variable speed motor and the planetary gear mechanism according to the present invention, configured as above, will be described with reference to FIGS. 2 and 4.

First, an acceleration/deceleration effect will be briefly described with reference to FIG. 2.

The first input rotary shaft (10) rotates at the same speed and in the same direction as the carrier (31) of the planetary gear mechanism (30). The second input rotary shaft (20) reduces the rotational speed of the ring gear (33), as a result of gear meshing between the worm wheel (33b) and the worm (22). That is, the variable speed motor (21) and the second input rotary shaft (20) are controlled so that the target rotational direction and speed of the ring gear (33) are achieved. The output shaft (40) rotates in the same direction and at the same speed of the sun gear (34).

Therefore, the rotational direction and speed of the first input rotary shaft (10) are equivalent to the rotational direction and speed of the carrier (31). Similarly, the target rotational direction and speed of the variable speed motor (21) and the second input rotary shaft (20) are equivalent to the rotational direction and speed of the ring gear (33). Similarly, the rotational direction and speed of the output shaft (40) are equivalent to the rotational direction and speed of the sun gear (34).

In a single pinion planetary gear system, a plurality of planet gears (32) surrounds the sun gear (34) in a single row as shown in FIG. 2. The following condition is set: (i) the variable speed motor (21) is stopped, (ii) the ring gear (33), which receives the motor rotational power of the variable speed motor (21), is fixed, (iii) the carrier (31) serves as an input element, and (iv) the sun gear (34) serves as an output element. Under this condition, the transmission ratio in the single pinion planetary gear system is increased by the number of turns of sun gear (34) per one turn of carrier (31). This is calculated by (the number of teeth of sun gear+the number of teeth of the ring gear) divided by (the number of teeth on sun gear).

When the number of teeth (ZR) of the ring gear (33) is 48 and the number of teeth (ZS) of the sun gear (34) is 16, (ZS+ZR)/ZS=64/16=4. In other words, the rotational speed is increased by a factor of 4.

In general, bicycle riders pedal at 60 rpm. Assuming that the carrier (31) rotates at 60 rpm, the rotational speed of the output shaft (40) and the sun gear (34) is 60 rpm×(ZS+ZR)/ZS=240 rpm.

When the carrier (31) rotates at 50 rpm and 70 rpm according to the above calculation formula, the rotational direction and speed of the output shaft (40) and the sun gear (34) become 200 rpm and 280 rpm, respectively.

Table 1 is a summary table for this. Hereinafter, for convenience, + indicates a clockwise direction, − indicates a counterclockwise direction, and the + sign will be omitted.

TABLE 1

| 50 rpm | 60 rpm | 70 rpm |
|---|---|---|
| 0 rpm | 0 rpm | 0 rpm |
| 200 rpm | 240 rpm | 280 rpm |

The following condition is set: (i) the carrier (31) receiving the main rotational power of the main power source (11) is fixed; (ii) the ring gear (33), which is connected to the variable speed motor (21) and the second input rotary shaft (20), serves as the input element, and (iii) the sun gear (34) serves as the output element. Under this condition, the transmission ratio in the single pinion planetary gear system is reversely increased by the number of turns of the sun gear (31) per one turn of the ring gear (33). This is calculated by (−) (the number of teeth of the ring gear) divided by (the number of teeth of sun gear).

Under the single pinion planetary gear system, the rotational direction of the ring gear and the rotational direction of the sun gear are opposite to each other. When the aforementioned numbers of teeth are assumed, −ZR/ZS=−48/16=−3. In other words, the rotational speed of the sun gear (34) is reversely increased by a factor of 3.

Table 2 shows the rotational direction and speed of the output shaft (40) and the sun gear (34) when the carrier (31) connected to the main power source (11) is fixed (0 rpm), and the ring gear (33) connected to the variable speed motor (21) and the second input rotary shaft (20) rotate at −10 rpm, 0 rpm, and +10 rpm.

TABLE 2

| 1st Input (Carrier) | 0 rpm | 0 rpm | 0 rpm |
|---|---|---|---|
| 2nd Input (Ring) | −10 rpm | 0 rpm | +10 rpm |
| Output (Sun) | +30 rpm | 0 rpm | −30 rpm |

When the rotational speed of the first input rotary shaft (10) and the carrier (31) connected to the main power source (11) is constant at 60 rpm and the ring gear (33) connected to the variable speed motor (21) and the second input rotary shaft (20) is rotating at 10 rpm, 0 rpm, and +10 rpm, the rotational direction and speed of the output shaft (40) and the sun gear (34) are as shown in Table 3.

TABLE 3

| 1st Input (Carrier) | 60 rpm | 60 rpm | 60 rpm |
|---|---|---|---|
| 2nd Input (Ring) | −10 rpm | 0 rpm | +10 rpm |
| Output (Sun) | 270 rpm | 240 rpm | 210 rpm |

As described above, in the single pinion planetary gear system structure, the output rotational speed varies depending on difference in the number of teeth of the ring gear and the sun gear, and the input and output elements, etc.

Given that the number of teeth of the ring gear (ZR) is 48 and the number of teeth of sun gear (ZS) is 16, when the first input rotary shaft (10) and the carrier (31) connected to the main power source (11) rotate constantly at 60 rpm, and when the ring gear (33) connected to the variable speed motor (21) and the second input rotary shaft (20) is fixed (0 rpm), the output shaft (40) and the sun gear (34) rotate at 240 rpm.

In addition, when the carrier (31) constantly rotates at 60 rpm and the ring gear (33) rotates clockwise (+) or counterclockwise (−) at 10 rpm, the sun gear (34), which is the output element, rotates at 210 rpm and 270 rpm, respectively. As a result, deceleration and acceleration occur.

Therefore, it is possible to decrease and increase the speed by using a variable speed motor and a single pinion planetary gear mechanism.

Table 4 shows the data of the changed rpm of the sun gear (34) serving as the output element. The data was obtained under the condition that (i) the carrier (31), serving as the first input element, rotates at 50 rpm, 60 rpm, and 70 rpm, and (ii) the ring gear (33), serving as the second input element, rotates from −40 to +40 rpm at an increment of 10 rpm.

TABLE 4

| | | 1st input (Carrier) rpm | | |
|---|---|---|---|---|
| | | 50 rpm | 60 rpm | 70 rpm |
| 2 nd Input (Ring) | 40 rpm | 80 | 120 | 160 |
| | 30 rpm | 110 | 150 | 190 |
| | 20 rpm | 140 | 180 | 220 |
| | 10 rpm | 170 | 210 | 250 |
| | 0 rpm | 200 | 240 | 280 |
| | −10 rpm | 230 | 270 | 310 |
| | −20 rpm | 260 | 300 | 340 |
| | −30 rpm | 290 | 330 | 370 |
| | −40 rpm | 320 | 360 | 400 |

As can be seen from Table 4, when the first input rotary shaft (10) and the carrier (31), which are connected to the main power source (11), constantly rotate at 50 rpm or 60 rpm, while the ring gear (33), which is connected to the variable speed motor (21) and the second input rotary shaft (20), rotates in a clockwise (+) or a counterclockwise (−) direction at −40 rpm to 40 rpm, the rotational speed of the sun gear (34), which is connected to the output shaft (40), can be increased or decreased.

Table 4 shows that setting the rotational speed interval of the ring gear (33) connected to the variable speed motor (21) and the second input rotary shaft (20) to 10 rpm yields 9 stages of shifting. If the rotational speed of the ring gear (33) is set to be at 5 rpm, the number of the stages becomes 17. Various gear shift configurations are possible with the present invention.

In FIG. 2, (i) the carrier (31) serves as the first input element that is connected to the main power source (11), and (ii) the ring gear (33) connected to the variable speed motor (21) serves as the second input element. Under this condition, the rotational speed of the sun gear (34), which serves as the output element, is (i) increased by (the number of teeth of sun gear (ZS)+the number of teeth of ring gear (ZR)) divided by (the number of teeth of sun gear (ZS)) and (ii) reversely increased by (ZR) divided by (ZS), thereby acceleration or deceleration occurs. See Table 4. Here, the number of teeth of the ring gear (ZR) and the number of teeth of the sun gear (ZS) are adjustable.

Hereinafter, an acceleration/deceleration effect will be briefly described with reference to FIG. 4.

The first input rotary shaft (10) rotates at the same speed and in the same direction as the ring gear (33) of the planetary gear mechanism (30). The second input rotary shaft (20) reduces the rotational speed of the carrier (31), as a result of gear meshing between the worm wheel (31c) and the worm (22). That is, the variable speed motor (21) and the second input rotary shaft (20) are controlled so that the target rotational direction and speed of the carrier (31) are achieved. The output shaft (40) rotates at the same speed and in the same direction as the sun gear (34).

Therefore, the rotational direction and speed of the first input rotary shaft (10) are equivalent to the rotational direction and speed of the ring gear (33). Similarly, the target rotational direction and speed of the variable speed motor (21) and the second input rotary shaft (20) are equivalent to the rotational direction and speed of the carrier (31). Similarly, the rotational direction and speed of the output shaft (40) are equivalent to the rotational direction and speed of the sun gear (34).

In a double pinion planetary gear system, a plurality of planet gears (32) surround the sun gear (34) in two rows as shown in FIG. 4. The following condition is given: (i) the variable speed motor (21) is stopped, (ii) the carrier (31), which receives the motor rotational power of the variable speed motor (21), is fixed, (iii) the ring gear (33) serves as an input element, and (iv) the sun gear (34) serves as an output element. Under this condition, the transmission ratio in the double pinion planetary gear system is increased by the number of turns of sun gear (34) per one turn of the ring gear (33). This is calculated by (the number of teeth of the ring gear) divided by (the number of teeth of sun gear).

Assuming that the number of teeth (ZR) of the ring gear (33) is 48 and the number of teeth (ZS) of the sun gear (34) is 12, the number of teeth of the ring gear/the number of teeth of the sun gear is 4 (=ZR/ZS=48/12). That is, the rotational speed is increased by four times.

In general, bicycle riders pedal at 60 rpm. Assuming the ring gear (33) equivalently rotates at 60 rpm, the rotational speed of the output shaft (40) and the sun gear (34) is 240 rpm (=60 rpm×ZR/ZS).

According to the above formula, when the ring gear (33) rotates at 50 rpm and 70 rpm, respectively, the rotational direction and speed of the output shaft (40) and the sun gear (34) become 200 rpm and 280 rpm, respectively.

Table 5 summarizes the calculation described above. Hereinafter, for convenience, + indicates a clockwise direction, − indicates a counterclockwise direction, and the + sign will be omitted.

TABLE 5

| 1 st Input (Ring) | 50 rpm | 60 rpm | 70 rpm |
|---|---|---|---|
| 2 nd Input (Carrier) | 0 rpm | 0 rpm | 0 rpm |
| Output (Sun) | 200 rpm | 240 rpm | 280 rpm |

In another case, the following condition is given: (i) the ring gear (33) receiving the rotational power of the main power source (11) is fixed (0 rpm), (ii) the carrier (31) connected to the variable speed motor (21) and the second input rotary shaft (20) serves as the input element, and (iii) the sun gear (34) is the output element. Under this condition, the transmission ratio in the double pinion planetary gear system reversely increases by the number of turns of sun gear (34) per one turn of the carrier (31). This is calculated by (the number of teeth of the sun gear (ZS)−the number of teeth of the ring gear (ZR)) divided by (the number of teeth of the sun gear (ZS).

In the double pinion planetary gear system, the rotational direction of the ring gear and that of the sun gear are the same. When the aforementioned numbers of teeth are assumed, (ZS−ZR)/ZS=(12−48)/12=−3. That is, the rotational speed is reversely increased by a factor of (−) 3.

Table 6 shows the rotational direction and speed of the output shaft (40) and the sun gear (34) when the ring gear (33) connected to the main power source (11) is fixed, and the carrier (31) connected to the variable speed motor (21) and the second input rotary shaft (20) rotate at −10 rpm, 0 rpm, and +10 rpm, respectively.

TABLE 6

| 1 st Input (Ring) | 0 rpm | 0 rpm | 0 rpm |
|---|---|---|---|
| 2 nd Input (Carrier) | −10 rpm | 0 rpm | +10 rpm |
| Output (Sun) | +30 rpm | 0 rpm | −30 rpm |

When the rotational speed of the first input rotary shaft (10) and the ring gear (33) connected to the main power source (11) is constant at 60 rpm and the carrier (31) connected to the variable speed motor (21) and the second input rotary shaft (20) rotates at 10 rpm, 0 rpm, and +10 rpm, respectively, the rotational direction and speed of the output shaft (40) and the sun gear (34) are as shown in Table 7.

TABLE 7

| 1 st Input (Ring) | 60 rpm | 60 rpm | 60 rpm |
|---|---|---|---|
| 2 nd Input (Carrier) | −10 rpm | 0 rpm | +10 rpm |
| Output (Sun) | 270 rpm | 240 rpm | 210 rpm |

As described above, in the structure of the double pinion planetary gear system, the output rotational speeds vary depending on the difference in the number of teeth of the ring gear and the sun gear, input/output elements, etc.

Given that the number of teeth of the ring gear (ZR) is 48 and the number of teeth of sun gear (ZS) is 12, when the first input rotary shaft (10) and the ring gear (33) connected to the main power source (11) rotate constantly at 60 rpm, and when the carrier (31) connected to the variable speed motor (21) and the second input rotary shaft (20) is fixed (0 rpm), the output shaft (40) and the sun gear (34) rotate at 240 rpm.

In addition, when the ring gear (33) constantly rotates at 60 rpm and the carrier (31) rotates clockwise (+) or counterclockwise (−) at 10 rpm, the sun gear (34), which is the output, rotates at 210 rpm or 270 rpm, respectively. As a result, deceleration and acceleration occur.

Therefore, the speed can be decreased or increased using a variable speed motor and a double pinion planetary gear mechanism.

Table 8 shows the data of the changed rpm of the sun gear (34). The data was obtained under the condition when (i) the ring gear (33), serving as the first input element, rotates at 50 rpm, 60 rpm, and 70 rpm, and (ii) the carrier (31), serving as the second input element, rotates from −40 to +40 rpm at an increment of 10 rpm.

TABLE 8

| | | 1 st Input (Ring) rpm | | |
|---|---|---|---|---|
| | | 50 rpm | 60 rpm | 70 rpm |
| 2 nd Input (Carrier) | 40 rpm | 80 | 120 | 160 |
| | 30 rpm | 110 | 150 | 190 |
| | 20 rpm | 140 | 180 | 220 |
| | 10 rpm | 170 | 210 | 250 |
| | 0 rpm | 200 | 240 | 280 |
| | −10 rpm | 230 | 270 | 310 |
| | −20 rpm | 260 | 300 | 340 |
| | −30 rpm | 290 | 330 | 370 |
| | −40 rpm | 320 | 360 | 400 |

As shown in Table 8, when the first input rotary shaft (10) and the ring gear (33) connected to the main power source (11) constantly rotates at 50 rpm or 60 rpm, and when the carrier (31) connected to the variable speed motor (21) and the second input rotary shaft (20) rotates in a clockwise (+) or a counterclockwise (−) direction from −40 rpm to 40 rpm, the rotational speed of the sun gear (34) connected to the output shaft (40) can be increased or decreased.

Table 8 shows the result obtained when (i) the rpm of the carrier (31) connected to the variable speed motor (21) and the second input rotary shaft (20) is set at the increment of 10 rpm, and (ii) the number of gear shift stages is 9.

If the rotational speed of the carrier (31) is set at the increment of 5 rpm, the number of stages becomes 17. Various gear shift configurations are possible with the present invention.

In the case that the ring gear (33) connected to the main power source (11) is the first input element, and the carrier (31) connected to the variable speed motor (21) is the second input element, as shown in FIG. 4, the rotational speed of the sun gear (34), which is the output element, is increased by a factor of the number of teeth of the ring gear (ZR) divided by the number of teeth of the sun gear (ZS) and reversely increased by a factor of (the number of teeth of the sun gear (ZS)−the number of teeth of the ring gear (ZR)) divided by the number of teeth of the sun gear as shown in Table 8, thereby acceleration or deceleration occurs.

Here, the number of teeth of the ring gear (ZR) and the number of teeth of the sun gear (ZS) are adjustable.

In the past, single-gear (or single-speed) bicycles with one front and one rear chain gear (sprocket) were manufactured such that, for each revolution a pedal takes, a rear wheel takes 3 revolutions.

Currently, bicycles equipped with various multi-stages external transmission devices such as a plurality of front and rear sprockets, front and rear derailleurs, and front and rear shifters are on the market. Applying the present invention to bicycles removes the multiple sprockets on a rear hub axle, the front and rear derailleurs and the rear shifter, makes the number of teeth of the front and rear chain gears (sprockets) the same, and makes a single speed bicycle that can be easily accelerated or decelerated.

The above illustrates and describes the preferred embodiments, but the present invention is not limited to the specific embodiments described above. Additionally, various modifications may be made by a person with an ordinary skill in the art to which the present invention pertains within the scope of the claims of the present invention. These modifications should not be understood individually from the technical spirit or prospect of the present invention.

INDUSTRIAL AVAILABILITY

In the transmission device for bicycles using the variable speed motor and the planetary gear mechanism of the present invention, (i) the first input rotary shaft receiving the main rotational power from the main power source and (ii) the output shaft are arranged on a concentric circle. In addition, all components of the planetary gear mechanism are connected to the first input rotary shaft, the second input rotary shaft, and the output shaft, whereby the second input rotary shaft is provided with the motor rotational power from a variable speed motor. Accordingly, because the transmission device can be configured with just one planetary gear mechanism and a variable speed motor, the transmission device has an advantage in that its size can be reduced.

What is claimed is:

1. A bicycle transmission using a variable speed motor and a planetary gear mechanism, comprising:
a first input rotary shaft (10), a second input rotary shaft (20), a planetary gear mechanism (30), an output shaft (40), and a control unit (50),
wherein the first input rotary shaft (10) is rotatably connected to a main power source (11),
wherein the second input rotary shaft (20) receives a motor rotational power from a variable speed motor (21),
wherein the planetary gear mechanism (30) receives first and second rotational power respectively from the first input rotary shaft (10) and the second input rotary shall (20), wherein the planetary gear mechanism (30) includes a ring gear (33), a carrier (31), a plurality of planet gears (32), and a sun gear (34),
wherein the output shaft (40) receives a third rotational power from the planetary gear mechanism (30),
wherein the control unit (50) controls the variable speed motor (21) and controls a rotational direction and speed of the second input rotary shaft (20),
wherein the first input rotary shaft (10) is arranged concentrically with the output shaft (40), the ring gear (33), the carrier (31), and the sun gear (34),
wherein a worm (22) is provided on an outer circumferential surface of the second input rotary shaft (20),
wherein the carrier (31) is coupled to the first input rotary shaft (10) and rotates with the first input rotary shaft (10),
wherein the plurality of planet gears (32) is rotatably installed on the carrier (31),
wherein the ring gear (33) is provided with an extension part (33a), wherein an inner circumferential surface of the ring gear (33) is meshed with an outer circumferential surface of the plurality of planet gears (32), wherein a worm wheel (33b) is provided on an outer circumferential surface of the extension part (33a), wherein the worm wheel (33b) rotates while being meshed with the worm (22),
wherein the sun gear (34) rotates while being meshed with the plurality of planet gears (32),
wherein a rotation axis of the second input rotary Shaft (20) is perpendicular to a rotation axis of the extension part (33a) of the ring gear (33),
wherein the sun gear (34) is provided with a hollow extension (34a), wherein the hollow extension (34a) surrounds the first input rotary shaft (10),
wherein the output shaft (40) surrounds the first input rotary shaft (10) and is directly connected to the hollow extension (34a) of the sun gear (34).

2. The bicycle transmission using the variable speed motor and the planetary gear mechanism of claim 1,
wherein the main power source (11) is connected to both ends of the first input rotary shaft (10).

3. The bicycle transmission using the variable speed motor and the planetary gear mechanism of claim 1,
wherein the first input rotary shaft (10) passes through a center of the output shaft (40).

4. A bicycle transmission using a variable speed motor and a planetary gear mechanism, comprising:
a first input rotary shaft (10), a second input rotary shaft (20), a planetary gear mechanism (30), an output shaft (40), and a control unit (50),
wherein the first input rotary shaft (10) is rotatably connected to a main power source (11),
wherein the second input rotary shaft (20) receives a motor rotational power from a variable speed motor (21),
wherein the planetary gear mechanism (30) receives first and second rotational power respectively from the first input rotary shaft (10) and the second input rotary shaft (20), wherein the planetary gear mechanism (30) includes a ring gear (33), a carrier (31), a plurality of planet gears (32), and a sun gear (34),
wherein the output shaft (40) receives a third rotational power from the planetary gear mechanism (30),
wherein the control unit (50) controls the variable speed motor (21) and controls a rotational direction and speed of the second input rotary shaft (20),
wherein the first input rotary shaft (10) is arranged concentrically with the output shaft (40), the ring gear (33), the carrier (31), and the sun gear (34),
wherein a worm (22) is provided on an outer circumferential surface of the second input rotary shaft (20),
wherein the ring gear (33) is coupled to the first input rotary shaft (10) and rotates together with the first input rotary shaft (10),
wherein an outer circumferential surface of the plurality of planet gears (32) is meshed with an inner circumferential surface of the ring gear (33),
wherein the carrier (31) is provided with an extension part (31b), wherein the plurality of planet gears (32) is rotatably installed on the carrier (31), wherein a worm wheel (31c) is installed on an outer circumferential surface of the extension part (31b), wherein the worm wheel (31c) rotates while being meshed with the worm (22),
wherein the sun gear (34) rotates while being meshed with the plurality of planet gears (32),
wherein a rotation axis of the second input rotary shaft (20) is perpendicular to a rotation axis of the extension part (31b) of the carrier (31),
wherein the sun near (34) is provided with a hollow extension part (34a), wherein the hollow extension part (34a) surrounds the first input rotary shaft (10),
wherein the output shaft (40) surrounds the first input rotary shaft (10) and is directly connected to the extension part (34a) of the sun gear (34), wherein the plurality of planet czars (32) comprises a first plurality of planet gears (32*a*) and a second plurality of planet gears (32*b*), wherein the first plurality of planet gears (32*a*) rotates while being externally meshed with the sun gear (34), wherein the second plurality of planet gears (32*b*) is externally meshed with the first plurality of planet nears (32*a*) and is internally meshed with the ring gear (33).

\* \* \* \* \*